May 1, 1945.  R. L. BOYER  2,375,071
SUPERCHARGER FOR FOUR-CYCLE GAS FUELED ENGINES
Filed March 23, 1943
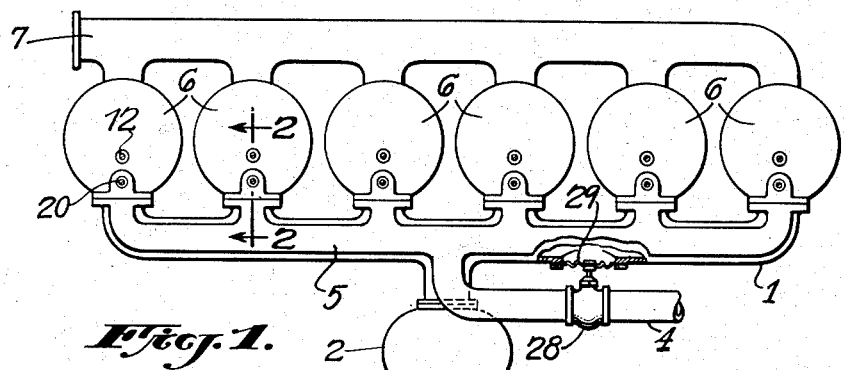
Fig. 1.
Fig. 2.
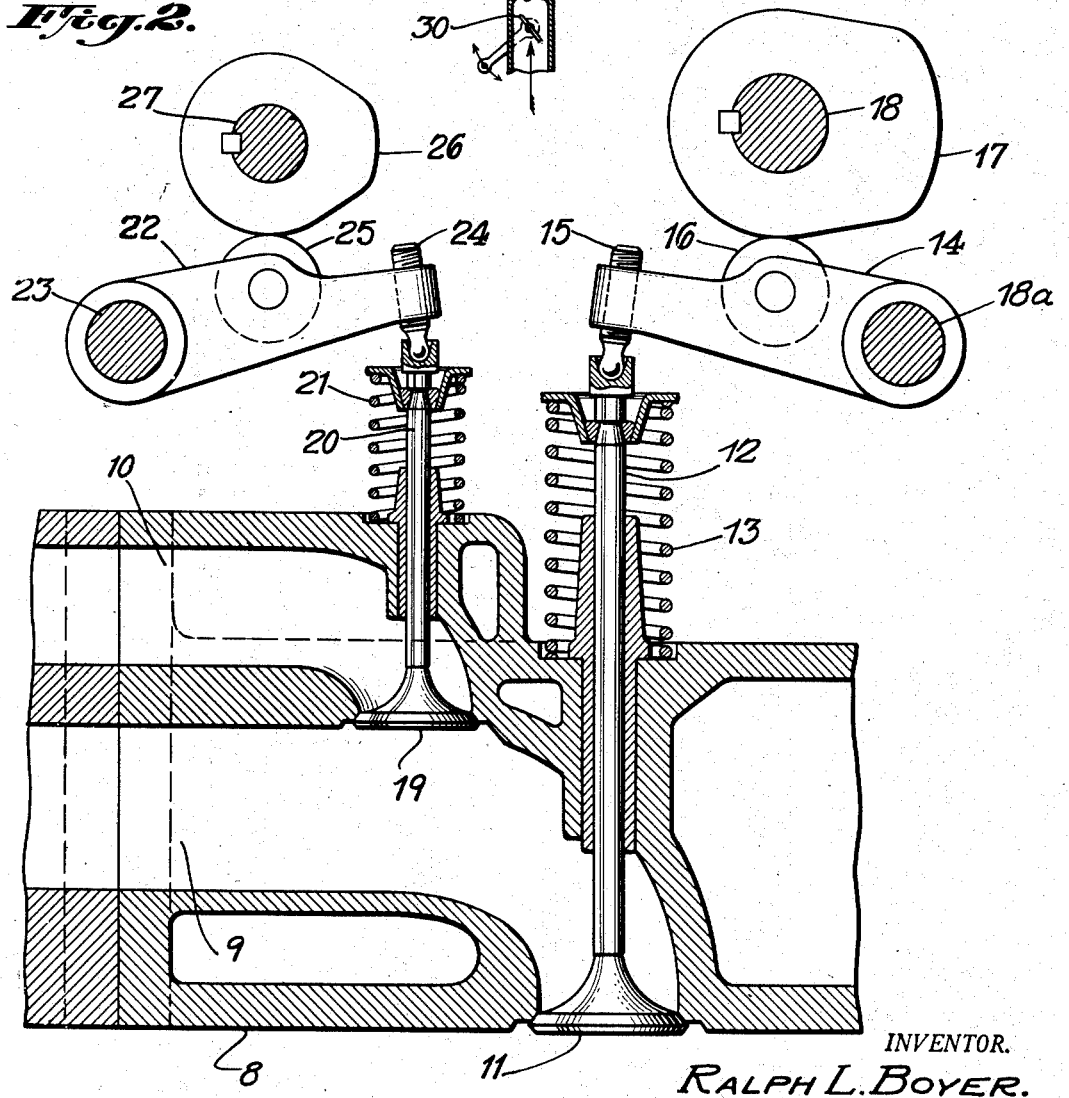
INVENTOR.
RALPH L. BOYER.
BY
Ward Crosby & Neal
ATTORNEYS.

Patented May 1, 1945

2,375,071

UNITED STATES PATENT OFFICE 2,375,071

SUPERCHARGER FOR FOUR-CYCLE GAS FUELED ENGINES

Ralph L. Boyer, Mount Vernon, Ohio, assignor to Cooper-Bessemer Corporation, Mount Vernon, Ohio, a corporation of Ohio Application March 23, 1943, Serial No. 480,132

4 Claims. (Cl. 123—120)

The supercharging of Diesel engines and gasoline engines has become common practice but this has not been true in respect to four cycle engines powered by gaseous fuels such as natural gas, coke-oven gas or other by-product gases, probably because of difficulties met with in overcoming other objections if supercharging by usual methods be attempted in engines of the last mentioned type. The primary object of the present invention accordingly is to provide a supercharging apparatus which will satisfy operating conditions as encountered in four cycle gas-fueled engines. Further objects and advantages of the invention will be in part obvious and in part specifically referred to in the description hereinafter contained which, taken in conjunction with the accompanying drawing, discloses a preferred form of supercharging apparatus operating in accordance with the invention. It should be understood, however, that the disclosure is only illustrative of the principles of the invention in its broader aspects. In the drawing—

Fig. 1 is a plan view in somewhat simplified diagrammatic form of a multi-cylinder four cycle gas fueled engine equipped with supercharging apparatus capable of operating in accordance with the present invention.

Fig. 2 is a fragmentary cross sectional view taken along the line 2—2 of Fig. 1.

In carrying out the present invention an intake manifold 1 may be used to which air under pressure is supplied by a blower or turboblower indicated diagrammatically at 2, and drawing in air through an intake pipe 3. Gaseous fuel under pressure will also be supplied from a supply pipe 4 leading to a manifold 5. The manifolds 1 and 5 will be connected to the respective engine cylinders 6 which may also be understood as connected in usual manner to an exhaust manifold 7.

In accordance with the present invention a main inlet valve controls the admission of a mixture of gas and air into the engine cylinders, the gas entering into the mixture being kept separate from the air until a point slightly in advance of the inlet valve above mentioned, at which point a gas valve is interposed so that the supply of gas to mix with the air may be shut off when desired. Then the valves above mentioned are so controlled that the inlet valve opens ahead of the gas valve, thus first supplying to the engine cylinder pure air which may be used for scavenging purposes. Then the gas valve is opened so as to supply to the cylinder a combustible mixture of air and gas in suitable proportions; then the gas valve is closed while the inlet valve still remains open, thus clearing the inlet passage of combustible mixture, after which the inlet valve closes. Then when the inlet valve opens at the beginning of the next cycle there will be no residual combustible mixture which might make trouble in the event of a backfire, and scavenging may be secured by the initial stream of pure air without the wastage of gaseous fuel by passing out through the exhaust valve.

The illustrated apparatus will be described as applied to one of the cylinders 6 the cylinder head 8 of which is provided with an air conducting passageway 9 (Fig. 2) connected in usual manner to the intake manifold 1, and a gaseous fuel supply passageway 10 likewise connected to the manifold 5. The supply of air to the cylinder space, and also the supply of combustible mixture as hereinafter described, is controlled by a suitable inlet valve 11 at the delivery end of the passageway 9. This valve is illustrated as of the poppet type having a stem 12, and urged toward closed position by a spring 13, suitable mechanism being provided to hold the valve open at proper times, as typified by an oscillating arm 14 having a stud 15 which engages the valve stem, and a roller 16 which engages a valve cam 17 on a rotary shaft 18.

The gas valve 19 controls communication between the passageways 9 and 10, and as above mentioned is located only a short distance ahead of the main valve 11, so that a mixture of gas and air is present only in the delivery end of passageway 9. This valve 19 may also be of the poppet type having a stem 20, and being urged toward closed position by a spring 21. Appropriate operating mechanism will also be provided for proper timing of the valve, as typified by the oscillating arm 22 pivoted about shaft 23 and having a stud 24 to engage the valve stem, the arm 22 having a roller 25 engaging a cam 26 carried by a rotary timing shaft 27.

As above mentioned the timing is such that inlet valve 11 opens ahead of valve 19. This will admit pure air under pressure to the cylinder, and the stream of air accordingly may be used for scavenging purposes by opening valve 11 while the exhaust valve (not shown) is still open. The exhaust valve is neither illustrated nor described in detail, since it may be assumed to be of any known or appropriate construction.

After scavenging is completed, the gas valve 19 will be open to admit gas into the delivery end of passageway 9 in admixture with the air, thus securing supercharging of the mixture, and after the requisite amount of fuel has been admitted valve 19 will be closed and valve 11 will still remain open long enough for the air passing through passageway 9 to clean out therefrom the residual gas remaining in the delivery end of such passageway. Thus when valve 11 is next opened as previously described, there will be no residual combustible mixture in passageway 9 or in the intake manifold 1, to cause trouble in the case of backfire, as frequently happens in gas fueled four cycle engines. The effects of backfire would be much more serious upon a combustible mixture under pressure, as would exist if residual gases from passageway 10 were permitted to remain in passageway 9 or manifold 1. Also the above sequence of operation will render a stream of pure air accessible for scavenging purposes and prevent waste of fuel gas by passing into the exhaust manifold.

Preferably the pressure of the gas in passageway 10 is controlled according to the intake air pressure existing in manifold 1. For this purpose a valve 28 indicated diagrammatically in Fig. 1 and controlled by a flexible diaphragm 29 subjected to the pressure of manifold 1, is interposed between the gas supply pipe 4 and manifold 5 so as to regulate the pressure in manifold 5 and passageways 10 according to the pressure existing in manifold 1 and passageways 9. In this way the gas-air ratio will be kept approximately constant, and governing of the engine may be secured by a throttle valve 30 in the air supply pipe 3 which reduces the supercharging pressure when the engine is operating at lower loads.

While the invention has been disclosed as carried out by apparatus of the above described specific construction it should be understood that many changes may be made therein without departing from the invention in its broader aspects, within the scope of the appended claims.

I claim:

1. Supercharging apparatus for four cycle gas fueled engines having means for supplying air under pressure including an air conducting passageway leading to the cylinder, an inlet valve controlling communication between said passageway and the cylinder space, means for supplying gas under pressure including a gaseous fuel supply passageway leading to said air supply passageway near said inlet valve, a gas valve controlling communication between said passageways, and actuating means for said valves constructed and arranged to open said inlet valve before said gas valve to produce a flow of air under pressure through said first mentioned passageway and inlet valve, then open said gas valve to produce the flow of an air and gas mixture under pressure through said inlet valve, and then close said gas valve before closing said inlet valve to provide a flow of air under pressure through said first mentioned passageway after the gas valve has closed and thereby discharge through the inlet valve, residual air and gas mixture from the space in the first mentioned passageway which lies between said valves.

2. Supercharging apparatus for multi-cylinder four cycle gas fueled engines, having an intake manifold with means for supplying air under pressure thereto, a gaseous fuel supply manifold having means for supplying gas under pressure thereto, air and gaseous fuel supply passageways for the respective cylinders connected respectively to said manifolds, inlet valve controlling communication between said air supply passageways and the respective cylinders, gas valves controlling communication between the respective air and fuel passageways, means constructed and arranged to open said inlet valves before and close the same after said gas valves, and means responsive to changes in pressure in said air manifold for varying the pressure in said fuel manifold.

3. Supercharging apparatus for multi-cylinder four cycle gas fueled engines, having an intake manifold with means for supplying air under pressure thereto, a gaseous fuel supply manifold having means for supplying gas under pressure thereto, air and gaseous fuel supply passageways for the respective cylinders connected respectively to said manifolds, inlet valves controlling communication between said air supply passageways and the respective cylinders, gas valves controlling communication between the respective air and fuel passageways, means constructed and arranged to open said inlet valves before and close the same after said gas valve, means responsive to changes in pressure in said air manifold for varying the pressure in said fuel manifold, and a throttle valve for regulating the pressure of the air supplied to said air intake manifold.

4. Supercharging apparatus for four cycle gas fueled engines having means for supplying air under pressure including an air conducting passageway leading to the cylinder, an inlet valve controlling communication between said passageway and the cylinder space, means for supplying gas under pressure including a gaseous fuel supply passageway leading to said air supply passageway near said inlet valve, a gas valve controlling communication between said passageways, and actuating means for said valves constructed and arranged to open said inlet valve before and close the same after said gas valve, means being provided to regulate the pressure in said fuel passageway in proportion to the pressure in said air passageway.

RALPH L. BOYER.